United States Patent Office 2,877,219
Patented Mar. 10, 1959

2,877,219

DERIVATIVES OF 3-ARYLAZO-NAPHTHALENE-SULFONIC ACID

Takeo Ueda, Tsuneo Wachi, and Tomoo Ito, Tokyo-to, Japan, assignors to Dainippon Pharmaceutical Co., Ltd., Higashi-ku, Osaka, Japan No Drawing. Application May 13, 1957
Serial No. 658,500

Claims priority, application Japan January 29, 1952

2 Claims. (Cl. 260—196)

This application is in part a continuation of copending application Serial No. 300,524, filed July 23, 1952, now abandoned.

The group of compounds embodying this invention correspond to the following formula

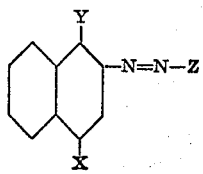

wherein X is an

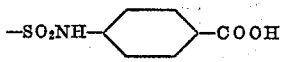

or an

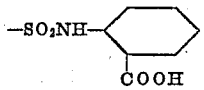

radical, Y is OH or $NH_2$, and Z is phenyl, o-methylphenyl, p-methylphenyl, p-carboxyphenyl, p-carbamylphenyl, p-carbonamidophenyl and p-acetylphenyl.

The aforesaid compounds are useful for dyeing, in essentially conventional manner, a wide variety of materials, such as wool, silk, etc., deep and uniformly level shades being obtained. Moreover, like Congo red (H. J. Murray et al: Proceeding of Society of Experimental and Biological Medicine, vol. 72, page 275, 1949), the new azo dyestuffs are characterized by antiviral activity.

The following examples which are directed by way of illustration to representative embodiments of the invention show how the compounds of the present invention may be prepared. In these examples, the relationship of parts by weight to parts by volume is the same as that between grams and milliliters.

EXAMPLE 1

3-(p-carboxyphenylazo)-4-aminonaphthalenesulfon-amide-(1)

1.35 parts by weight of p-aminobenzoic acid dissolved in 25 parts by volume of water containing 2.5 parts by volume of concentrated hydrochloric acid and cooled externally with ice, was diazotized with a solution of 0.8 part by weight of sodium nitrite in 5 parts by volume of water. The solution of the diazonium salt was neutralized by means of sodium acetate, and mixed, with a cooled solution of 2.2 parts by weight of 4-aminonaphthalenesulfonamide-(1) and 5 parts by weight of crystalline sodium acetate in 200 parts by volume of methanol and 40 parts by volume of water, and the mixture was allowed to stand overnight in an ice-box. After the methanol was removed by distillation from the reaction mixture, the precipitate was filtered and recrystallized from ethanol to dark-red fine needles, melting with decomposition at 278° C. The yield was 1.1 parts by weight.

Analysis for $C_{17}H_{14}O_4N_4S$: N (calculated), 15.68%; N (found), 15.55%.

EXAMPLE 2 o-(3-phenylazo - 4 - aminonaphthalenesulfonamido)-benzoic acid 0.46 part by weight of aniline dissolved in 10 parts by volume of water containing 1.3 parts by volume of concentrated hydrochloric acid and cooled externally with ice, was diazotized with a solution of 0.4 part by weight of sodium nitrite in 5 parts by volume of water. The solution of the diazonium salt was neutralized by means of sodium acetate, and mixed, with agitation, with a cooled solution of 1.7 parts by weight of o-(4-aminonaphthalenesulfonamide)-benzoic acid and 0.6 part by weight of sodium carbonate in 200 parts by volume of ethanol, and the mixture was allowed to stand overnight in an ice-box. After the ethanol was removed by evaporation out of the reaction mixture, the precipitate was filtered and recrystallized from ethanol to orange fine needles, melting with decomposition at ca. 240° C. The yield was 2.5 parts by weight.

Analysis for $C_{23}H_{18}O_4N_4S$: N (calculated), 12.55%; N (found), 12.71%.

EXAMPLE 3 o-[3-(p - carboxyphenylazo)-4-aminonaphthalenesulfonamido]-benzoic acid 1.3 parts by weight of p-aminobenzoic acid dissolved in a mixture of 20 parts by volume of water and 2.5 parts by volume of concentrated hydrochloric acid was diazotized with a solution of 0.8 part by weight of sodium nitrite in 5 parts by volume of water. This solution of the diazonium salt thus produced was dropped, with stirring, into a solution of 3.4 parts by weight of o-(4-aminonaphthalenesulfonamide)-benzoic acid in mixture of 400 parts by volume of methanol and 4 parts by volume of pyridine, the temperature being kept below 5° C. After 2 hours' stirring, 50 parts by volume of water was added to the reaction solution, and the mixture was then allowed to stand overnight. The precipitate thus obtained was filtered, and recrystallized from methanol. The yield was 2.1 parts by weight. This substance was obtained as reddish orange fine needles, melting with decomposition at 276° C.–277° C. It was insoluble in water, ether and benzene, and soluble in alcohol and aqueous caustic soda solution.

Analysis for $C_{24}H_{18}O_6N_4S$: N (calculated), 11.42%; N (found), 11.29%.

EXAMPLE 4 p-(3-phenylazo-4-aminonaphthalenesulfonamido)-benzoic acid 0.9 part by weight of aniline dissolved in a mixture of 20 parts by volume of water and 2.5 parts by volume of concentrated hydrochloric acid was diazotized with a solution of 0.8 part by weight of sodium nitrite in 5 parts by volume of water. The solution of the diazonium salt thus prepared was dropped, with stirring, into a solution of 3.4 parts by weight of p-(4-aminonaphthalenesulfonamido)-benzoic acid in a mixture of 400 parts by volume of methanol and 4 parts by volume of pyridine, the temperature being kept below 10° C. After 2 hours' stirring, the reaction mixture was allowed to stand overnight. After removing the methanol from the mixture by distillation, the precipitate was separated by filtration and recrystallized from 70% alcohol. The yield of product was 2.6 parts by weight. This substance was obtained as orange fine needles, melting with decomposition at 266° C.–267° C. It was insoluble in water and benzene, and soluble in ether, alcohol and aqueous caustic soda solution.

Analysis for $C_{23}H_{18}O_4N_4S$: N (calculated), 12.55%; N (found), 12.42%.

EXAMPLE 5 p - [3 - (p - carboxyphenylazo) - 4 - aminonaphthalenesulfonamido]-benzoic acid 0.65 part by weight of p-aminobenzoic acid dissolved in a mixture of 10 parts by volume of water and 1.3 parts by volume of concentrated hydrochloric acid was diazotized with a solution of 0.4 part by weight of sodium nitrite in 5 parts by volume of water. The solution of the diazonium salt thus prepared was dropped, with stirring, into a solution of 1.7 parts by weight of p-(4-aminonaphthalenesulfonamide)-benzoic acid in a mixture of 200 parts by volume of methanol and 2 parts by volume of pyridine, the temperature being kept below 10° C. After 2 hours' stirring, 200 parts by volume of water was added to the reaction solution, and the mixture was allowed to stand overnight. The precipitate thus obtained was filtered, and recrystallized from a mixture of acetone, methanol and water. The yield of product was 1.3 parts by weight. This substance was obtained as reddish orange fine needles, melting with decomposition at ca. 303° C. It was insoluble in water, ether and benzene, and soluble in alcohol and aqueous caustic soda solution.

Analysis for $C_{24}H_{18}O_6N_4S$: N (calculated), 11.42%; N (found), 11.35%.

EXAMPLE 6

3 - (p - carbamylphenylazo) - 4 - aminonaphthalenesulfonamide 2.7 parts by weight of p-aminobenzamide dissolved in a mixture of 20 parts by volume of water and 5 parts by volume of concentrated hydrochloric acid was diazotized with a solution of 1.5 parts by weight of sodium nitrite in 5 parts by volume of water. The solution of the diazonium salt thus prepared was dropped, with stirring, into a solution of 4.5 parts by weight of 4-aminonaphthalenesulfonamide in a mixture of 400 parts by volume of methanol, 50 parts by volume of water and 8 parts by volume of pyridine, the temperature being kept below 10° C. After 2 hours' stirring, 100 parts by volume of water was added to the reaction mixture, and the mixture was allowed to stand overnight. The precipitate thus obtained was filtered, and recrystallized from 60% alcohol. The yield was 3.5 parts by weight. This substance was red fine needles, and melted at 244° C.–245° C. It was insoluble in water, ether and benzene, but soluble in either alcohol or aqueous caustic soda solution.

Analysis for $C_{17}H_{15}O_3N_5S$: N (calculated), 18.97%; N (found), 18.86%.

EXAMPLE 7

3 - (p - carboxyphenylazo) - 4 - hydroxynaphthalenesulfonic acid-(1)

1.4 parts by weight of p-aminobenzoic acid were dissolved in 10 parts by volume of water containing 2 parts by volume of 38% hydrochloric acid, and diazotized by 1 part by volume of 30% sodium nitrite solution at a temperature of 0° C.–5° C. This diazotized solution was added to a solution of 0.7 part by weight of α-naphtholsulfonic acid-(4) in 10 parts by volume of 5% caustic soda solution. After standing for four hours the reaction mixture was acidified by the addition of hydrochloric acid. The obtained red-colored precipitate was isolated by filtration. Recrystallization was effected from methanol solution and red needles were obtained in a yield of 3.0 parts by weight.

Analysis for $C_{17}H_{12}O_6N_2S$: N (calculated), 7.52%; N (found), 7.43%.

EXAMPLE 8

3 - (o - carboxyphenylazo) - 4 - hydroxynaphthalenesulfonic acid (1)

2.2 parts by weight of α-naphtholsulfonic acid-(4) and 1.4 parts by weight of o-aminobenzoic acid were treated according to the method as in Example 7, and red needles were obtained in 3.1 parts by weight yield.

Analysis for $C_{17}H_{12}O_6N_2S$: N (calculated), 7.52%; N (found), 7.55%.

EXAMPLE 9

3 - (p - carbonamidophenylazo) - 4 - hydroxynaphthalenesulfonic acid-(1)

2.2 parts by weight of α-naphtholsulfonic acid-(4) and 1.4 parts by weight of p-aminobenzamide were treated according to the method as in Example 7, and red needles were obtained. The yield was 3 parts by weight.

Analysis for $C_{17}H_{13}O_5N_3S$: N (calculated), 11.31%; N (found), 11.56%.

EXAMPLE 10

3-(p-carboxyphenylazo)-4-hydroxynaphthalenesulfonamide-(1)

0.27 part by weight of p-aminobenzoic acid was diazotized after the manner described in Example 7, and was then neutralized by the addition of sodium acetate. The resultant solution was mixed with 0.45 part by weight of 4-hydroxynaphthalenesulfonamide-(1) dissolved in 2.5 parts by volume of 5% caustic soda solution and 10 parts by volume of water. The resulting red precipitate was isolated by filtration. The precipitate was recrystallized from methanol yielding red needles. The yield was 0.3 part by weight.

Analysis for $C_{17}H_{13}O_5N_3S$: N (calculated), 11.31%; N (found), 11.47%.

EXAMPLE 11

3-(p-carboxyphenylazo)-4-hydroxynaphthalenesulfonamide 3.5 parts by weight of 3-(p-carboxyphenylazo)-4-hydroxynaphthalenesulfonamide suspended in 40 parts by volume of 20% sulfuric acid, was diazotized with a solution of 0.73 part by weight of sodium nitrite in 3 parts by volume of water. The diazotized solution was boiled until no nitrogen gas evolved. After cooling, a red precipitate was obtained which was isolated by filtration. There were obtained red needles by recrystallization from methanol.

Analysis for $C_{17}H_{13}O_5N_3S$: N (calculated), 11.05%; N (found), 11.27%.

EXAMPLE 12 p-[(3-p-carbamylphenylazo)-4-aminonaphthalenesulfonamido]-benzoic acid 0.65 part by weight of p-aminobenzamide dissolved in 10 parts by volume of water containing 1.3 parts by volume of concentrated hydrochloric acid, was diazotized with a solution of 0.4 part by weight of sodium nitrite in 5 parts by volume of water. This solution of the diazonium salt was dropped, with stirring, into a solution of 1.7 parts by weight of p-(4-aminonaphthalenesulfonamido)-benzoic acid in a mixture of 200 parts by volume of methanol and 2 parts by volume of pyridine, the temperature being kept below 10° C. After 2 hours' stirring, 100 parts by volume of water was added to the reaction mixture, and the mixture was allowed to stand overnight. The precipitate thus obtained was filtered, and recrystallized from a mixture of acetone, alcohol and water. The yield was 1.2 parts.

by weight. This product was obtained as reddish orange fine needles melting with decomposition at 271° C.–272° C. It was insoluble in water, ether and benzene, and soluble in alcohol and aqueous caustic soda solution.

Analysis for $C_{24}H_{19}O_5N_5S$: N (calculated), 14.32%; N (found), 14.22%.

EXAMPLE 13

*o-[3-(p-carbamylphenylazo)-4-aminonaphthalene-sulfonamide]-benzoic acid*

1.3 parts by weight of p-aminobenzamide dissolved in 20 parts by volume of water containing 2.5 parts by volume of concentrated hydrochloric acid, was diazotized with a solution of 0.8 part by weight of sodium nitrite in 5 parts by volume of water. The solution of the diazonium salt thus prepared was dropped, with stirring, into a solution of 3.4 parts by weight of o-(4-aminonaphthalenesulfonamido)-benzoic acid in a mixture of 260 parts by volume of methanol, 30 parts by volume of water and 4 parts by volume of pyridine, the temperature being kept below 10° C. After 3 hours' stirring, 100 parts by volume of water was added to the reaction mixture, and the mixture thus obtained was allowed to stand overnight. The precipitate thus obtained was filtered, and recrystallized from a mixture of acetone, alcohol and water. The yield was 2.9 parts by weight. This substance was obtained as reddish-orange fine needles, melting with decomposition at 261° C.–262° C. It was insoluble in water, ether and benzene, and soluble in either alcohol or caustic soda solution.

Analysis for $C_{24}H_{19}O_5N_5S$: N (calculated), 14.32%; N (found), 14.02%.

EXAMPLE 14

*p-(3-phenylazo-4-hydroxynaphthalenesulfonamido)-benzoic acid*

0.5 part by weight of p-(4-hydroxynaphthalenesulfonamido)-benzoic acid was dissolved in 20 parts by volume of methanol containing 1 part by volume of pyridine, and to this solution was added a solution which was prepared by diazotizing 0.14 part by weight of aniline with 0.13 part by weight of sodium nitrite. The reaction mixture thus prepared was allowed to stand for 2 hours, and the resulting precipitate was filtered out, and recrystallized from methanol to yield red needles which melted at 281° C. with decomposition. The yield of product was 0.47 part by weight.

Analysis for $C_{23}H_{17}O_5N_3S$: N (calculated), 9.39%; N (found), 9.31%.

EXAMPLE 15

*o-(3-phenylazo-4-hydroxynaphthalenesulfonamido)-benzoic acid*

1.5 parts by weight of o-(4-hydroxynaphthalenesulfonamido)-benzoic acid and 0.5 part by weight of aniline were treated according to the method as in Example 14, and there were obtained red needle crystals, which melted at 254° C. with decomposition. The yield was 1.3 parts by weight.

Analysis for $C_{23}H_{17}O_5N_3S$: N (calculated), 9.39%; N (found), 9.10%.

EXAMPLE 16

*p-[3-(p-methylphenylazo)-4-hydroxynaphthalene-sulfonamido]-benzoic acid*

0.31 part by weight of p-(4-hydroxynaphthalenesulfonamido)-benzoic acid was dissolved in 30 parts by volume of methanol containing 1 part by volume of pyridine, and to this solution was added a solution which was prepared by diazotization of 0.1 part by weight of p-toluidine. The reaction mixture thus prepared was allowed to stand overnight, and the resulting precipitate was isolated by filtration, and recrystallized from methanol to yield red needles which melted at 276° C. with decomposition. The yield was 0.29 part by weight.

Analysis for $C_{24}H_{19}O_5N_3S$: N (calculated), 9.11%; N (found), 9.38%.

EXAMPLE 17

*o-[3-(p-methylphenylazo)-4-hydroxynaphthalene-sulfonamido]-benzoic acid*

0.5 part by weight of o-(4-hydroxynaphthalenesulfonamide)-benzoic acid and 0.14 part by weight of p-toluidine were treated according to a method as in Example 16, and red needles were obtained, which melted at 291° C. with decomposition. The yield was 0.5 part by weight.

Analysis for $C_{24}H_{19}O_5N_3S$: N (calculated), 9.11%; N (found), 9.36%.

Having thus disclosed the invention what is claimed is:

1. A compound of the formula

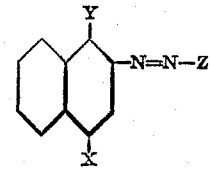

wherein X is a member selected from the class consisting of

and

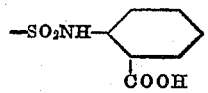

radicals, Y is a member selected from the group consisting of OH and $NH_2$, and Z is a member selected from the group consisting of the phenyl, o-methylphenyl, p-methylphenyl, p-carboxyphenyl, p-carbamylphenyl, p-carbonamidophenyl and p-acetylphenyl.

2. *p* - (3-phenylazo-4-aminonaphthalenesulfonamido)-benzoic acid.

References Cited in the file of this patent

UNITED STATES PATENTS

| | | |
|---|---|---|
| 333,041 | Vollbrecht et al. | Dec. 22, 1885 |
| 498,982 | Krekeler et al. | June 6, 1893 |
| 2,302,955 | Raiziss et al. | Nov. 24, 1942 |
| 2,340,584 | Dohrn et al. | Feb. 1, 1944 |
| 2,434,173 | Mackenzie et al. | Jan. 6, 1948 |
| 2,498,418 | Hanford | Feb. 21, 1950 |

FOREIGN PATENTS

| | | |
|---|---|---|
| 2,237 | Great Britain | of 1883 |
| 5,515 | Great Britain | of 1883 |
| 86,314 | Germany | Mar. 27, 1896 |

OTHER REFERENCES

Conant: J. A. C. S., vol. 48, 1926, pages 2476–7.